(12) United States Patent
Lindsay (10) Patent No.: US 7,739,613 B2
(45) Date of Patent: Jun. 15, 2010

(54) GRAPHICS TIERING STRATEGY INCORPORATING BITMAPS AND WINDOW GEOMETRIES

(75) Inventor: Donald J. Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 11/558,844

(22) Filed: Nov. 10, 2006

(65) Prior Publication Data

US 2008/0115074 A1  May 15, 2008

(51) Int. Cl.
*G06F 3/00* (2006.01)
(52) U.S. Cl. .................. 715/768; 715/719; 715/763; 715/764; 715/792
(58) Field of Classification Search .............. 715/853, 715/810, 764, 846, 792, 768, 719, 763
See application file for complete search history.

(56) References Cited

U.S. PATENT DOCUMENTS

| | | | |
|---|---|---|---|
| 5,307,451 A | 4/1994 | Clark | |
| 5,805,163 A | 9/1998 | Bagnas | |
| 6,072,489 A | 6/2000 | Gough et al. | |
| 6,111,614 A | 8/2000 | Mugura et al. | |
| 6,317,128 B1 | 11/2001 | Harrison et al. | |
| 6,549,218 B1 | 4/2003 | Gershony et al. | |
| 6,694,486 B2 | 2/2004 | Frank et al. | |
| 6,731,310 B2* | 5/2004 | Craycroft et al. | 715/765 |
| 6,954,905 B2 | 10/2005 | Brown et al. | |
| 6,996,783 B2 | 2/2006 | Brown et al. | |
| 7,012,616 B1 | 3/2006 | Chatterjee | |
| 2003/0107583 A1 | 6/2003 | Fushiki et al. | |
| 2004/0066538 A1 | 4/2004 | Rozzi | |
| 2005/0088447 A1 | 4/2005 | Hanggie et al. | |

OTHER PUBLICATIONS

Dragicevic, et al., "Artistic Resizing: A Technique For Rich Scale-Sensitive Vector Graphics", retrieved at <<http://delivery.acm.org/10.1145/1100000/1095069/p201-dragicevic.pdf? key1=1095069&key2=6970198511&coll=GUIDE&dl=GUIDE&CFID=1451262&CFTOKEN=94649789>>, UIST'05, Oct. 23-27, 2005, ACM, 2005, pp. 201-210.
"DWM Blur Behind Overview", retrieved on Sep. 22, 2006 at <<http://windowssdk.msdn.microsoft.com/en-us/library/ms649769.aspx>>, Microsoft Corporation, 2006, pp. 1-4.
"Getting Started with Transparency", retrieved at <<http://www.adobe.com/products/creativesuite/pdfs/transparency_quick_start.pdf>>, Adobe System Incorporated , 2005, pp. 2, pp. 1-7.
Kerr, "Windows Vista for Developers—Part 3—The Desktop Window Manager", retrieved on Sep. 22, 2006, at <<http://weblogs.asp.net/kennykerr/archive/2006/08/10/Windows-Vista-for-Developers_1320_-Part-3-_1320_-The-Desktop-Window-Manager.aspx>>, Aug. 10, 2006, pp. 1-39.

* cited by examiner

*Primary Examiner*—Weilun Lo
*Assistant Examiner*—Mylinh Tran
(74) *Attorney, Agent, or Firm*—Lee & Hayes, PLLC (57) ABSTRACT

Various embodiments employ a graphics tiering approach that utilizes multiple different tiers, each of which defines how a user interface is presented to a user. In accordance with at least some embodiments, a higher end tier is provided and utilizes a combination of both bitmaps and realtime window geometry computations to provide a user interface that can include both transparent and blurred user interface elements. In addition, at least some additional tiers repurpose the higher end tier by incorporating an opaque element behind the transparent element to satisfy the limitations associated with the additional tiers.

19 Claims, 8 Drawing Sheets

GRAPHICS TIERING STRATEGY INCORPORATING BITMAPS AND WINDOW GEOMETRIES

BACKGROUND

There are many different types of computing devices and software packages that are available for consumers.

For example, high end devices typically come with sophisticated processing capabilities, e.g. graphics and video presentation processing capabilities, which can provide a robust user experience. On the other hand, lower end devices often do not possess the same sophisticated processing capabilities. Perhaps these devices have different, less robust video cards and/or limited graphics or video memory. Accordingly, the user experience is somewhat different from that of the high end devices. For example, while the higher end devices may be able to render video and graphics content in a robust manner, the lower end devices might, for example, render content in some compromised fashion, such as at a lower frame rate.

With regard to software packages, many times a particular software package will be offered at different price points. For example, a lower price point package may not have all of the sophisticated video and graphics processing capabilities as a higher price point package.

Against this backdrop, challenges remain with regard to finding solutions to help "graduate" graphics presentations from the high end scenarios to the low end scenarios that are, from a user's perspective, seamless, and which preserve, along the way, various elements that convey a desirable user interface "look and feel". Such a desirable "look and feel" may, for example, manifest itself in a desire to preserve a brand identify across a diverse product line.

SUMMARY

Various embodiments employ a graphics tiering approach that utilizes multiple different tiers, each of which defines how a user interface is presented to a user. In accordance with at least some embodiments, a higher end tier is provided and utilizes a combination of both bitmaps and realtime window geometry computations to provide a user interface that can include both transparent and blurred user interface elements. In addition, at least some additional tiers repurpose the higher end tier by incorporating an opaque element behind the transparent element to satisfy the limitations associated with the additional tiers.

DETAILED DESCRIPTION

Overview

Various embodiments employ a graphics tiering approach that utilizes multiple different tiers, each of which defines how a user interface is presented to a user. In accordance with at least some embodiments, a higher end tier is provided and utilizes a combination of both bitmaps and realtime window geometry computations to provide a user interface that can include both transparent and blurred user interface elements. In addition, at least some additional tiers repurpose aspects of the higher end tier by incorporating an opaque element behind the transparent element to satisfy the limitations associated with the additional tiers.

Exemplary Graphics Tiers

Graphics tiering refers to the notion of supporting a generally consistent, seamless user interface experience across a wide variety of computing device scenarios, use scenarios and/or software price point scenarios. A graphics tiering strategy describes or defines how various visual attributes are enabled or disabled relative to different scenarios that can include, by way of example and not limitation, video hardware capability scenarios, current power availability scenarios (e.g., a laptop running on batteries versus a laptop with a direct power connection), or product differentiation scenarios (e.g. home vs. business versions of a particular software package).

Figure 1:
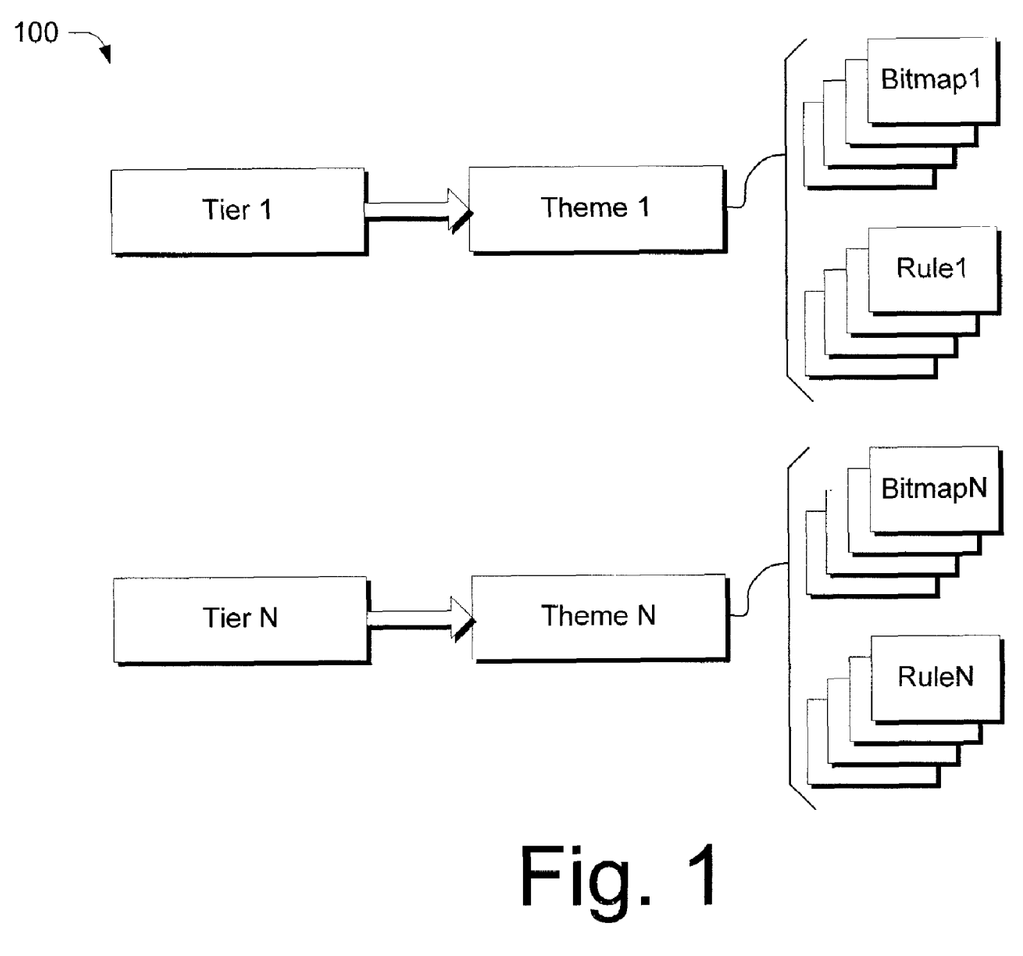
FIG. 1 illustrates a graphics tiering strategy.

Some graphics tiers have been implemented using so-called themes which are simply collections of bitmap files that are used to describe and present a particular application window onscreen. As an example, consider FIG. 1 which illustrates a graphics tiering strategy generally at 100 that utilizes themes. Here, there are a number of graphics tiers designated "Tier 1" through "Tier N". Each graphics tier is typically associated with a different theme which, in turn, utilizes its own set of theme parts that include bitmap images and rules that describe how to position, scale or stretch each element to construct each user interface element (e.g., a window frame, buttons, etc.).

This type of approach can be somewhat inefficient insofar as utilizing a different theme for each individual tier. Specifically, theme files consume hard disk and memory space and can be upwards of 10 MB in size. Thus, requiring different theme files for each individual tier can consume valuable resources. Further, there can be a performance penalty when switching themes due to their large size, e.g. reading off of a hard disk into memory. Further, there is a support cost to designing, developing and testing multiple themes for a product. Thus, in this approach, bitmaps and rules have to be developed, managed and shipped for each of the individual tiers.

In accordance with one embodiment, a higher end tier is provided and utilizes a combination of both bitmaps and realtime window geometry computations to provide a user interface. In at least some embodiments, the user interface can include both transparent and blurred user interface elements. In addition, at least some additional tiers repurpose aspects of the higher end tier by incorporating an opaque element behind the transparent element to satisfy the limitations that are associated with the additional tiers. In this manner, one or more themes can be eliminated. By eliminating one or more themes in a manner described below, problems associated with requiring different theme files for each theme can be mitigate. Specifically, the use of computing resources can be reduced over previous approaches, performance penalties associated with switching between different themes can be reduced, and design and maintenance costs can be reduced.

In the discussion that follows, an exemplary graphics tiering strategy is first presented. Following this, a discussion of the nuances of the top most tier is provided, followed by a discussion of the next intermediate tier that repurposes the theme associated with the top most tier. As an example of one graphics tiering strategy in accordance with one embodiment, consider the table just below:

Graphics Tiering Strategy

| Tier Name | Tier Characteristics |
|---|---|
| Aero | Topmost tier that provides a full suite of graphics capabilities; associated with transparent glass window frames with real time blurred background behind the window frame; utilizes advanced video card hardware. |
| Standard | Supports most of the graphic attributes of Aero, but disables the transparent glass window frame with background blurring; window frame is drawn opaque; invoked through less capable video hardware scenarios, low-power scenarios (i.e. laptop on batteries) or by product price point. |
| Basic | Provided for lesser-capable devices. |
| Classic | Lowest-capable graphic tier; provided primarily for application compatibility. |

Here, there are four different tiers that are available. A high end tier, referred to as Aero, provides a full suite of graphics capabilities. In accordance with one embodiment, this full suite of graphics capabilities includes what are known as transparent glass window frames with real time blurred background behind the window frame (described in detail below). The rendering of the transparent glass window frame with real time blurring utilizes the more sophisticated graphics capabilities of high end video cards. Specifically, some high end video cards include a functionality referred to as a "pixel shader" which essentially provides the ability to blur objects that are rendered. As such, in this tier, this functionality (or one similar to it) is utilized to provide the transparent glass window frame with real time blurring.

The next tier down—Standard—supports most of the graphic attributes of Aero, but disables the transparent glass window frame with background blurring. In this case, the window frame is drawn or rendered opaque. This can be desirable in scenarios where there is low power or the device is running a lower price point software package.

The remaining two tiers are somewhat self-explanatory.

Topmost Tier—Transparent Glass Window Frame with Real Time Blurring

Figure 2:
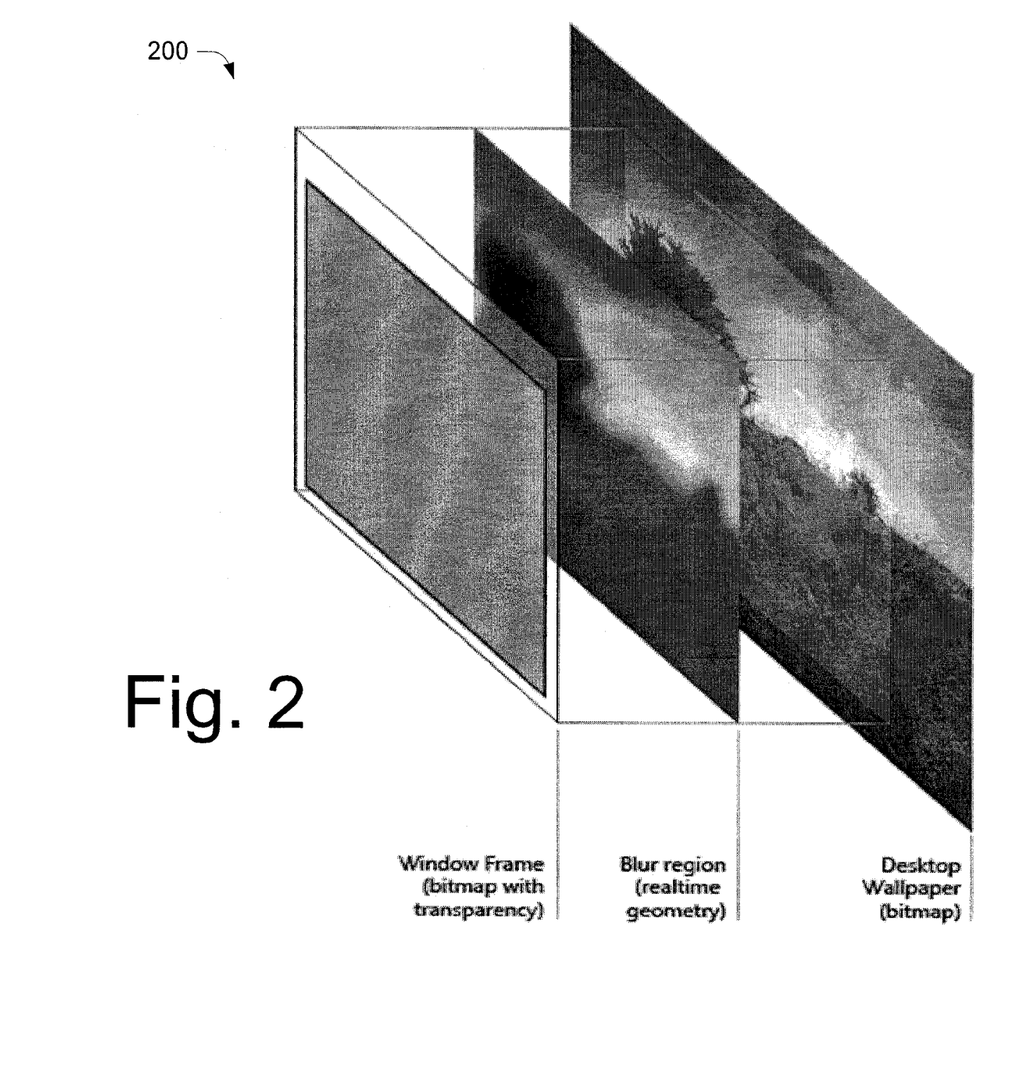
FIG. 2 illustrates various layers that represent how an application window frame is constructed in accordance with one embodiment.

FIG. 2 illustrates, generally at 200, various layers that represent how an application window frame can be constructed in the topmost graphics tier mentioned above. In this approach, both bitmaps and realtime window geometry computations are utilized to render application window frames that comprise part of a user interface.

In this example, there are a number of elements that make up the user interface and which are traditionally rendered using bitmaps. This can include caption buttons, edge highlights, corner highlights, and the like. In this example, a window frame is rendered to include one or more bitmaps and a transparency or glass frame, as well as desktop wall paper in the form of a bitmap. Notice also in this example that a blur element or region is interposed between overlying bitmaps and the desktop wall paper. This blur element is generated by computing, in real time, the application window geometry dimensions relative to which the blur element is to be rendered, and then rendering, for a particular computed window geometry, the blur layer. The effect of this rendering is to provide a generally transparent user interface portion having underlying blurred elements. As an example, consider FIG. 3.

Figure 3:
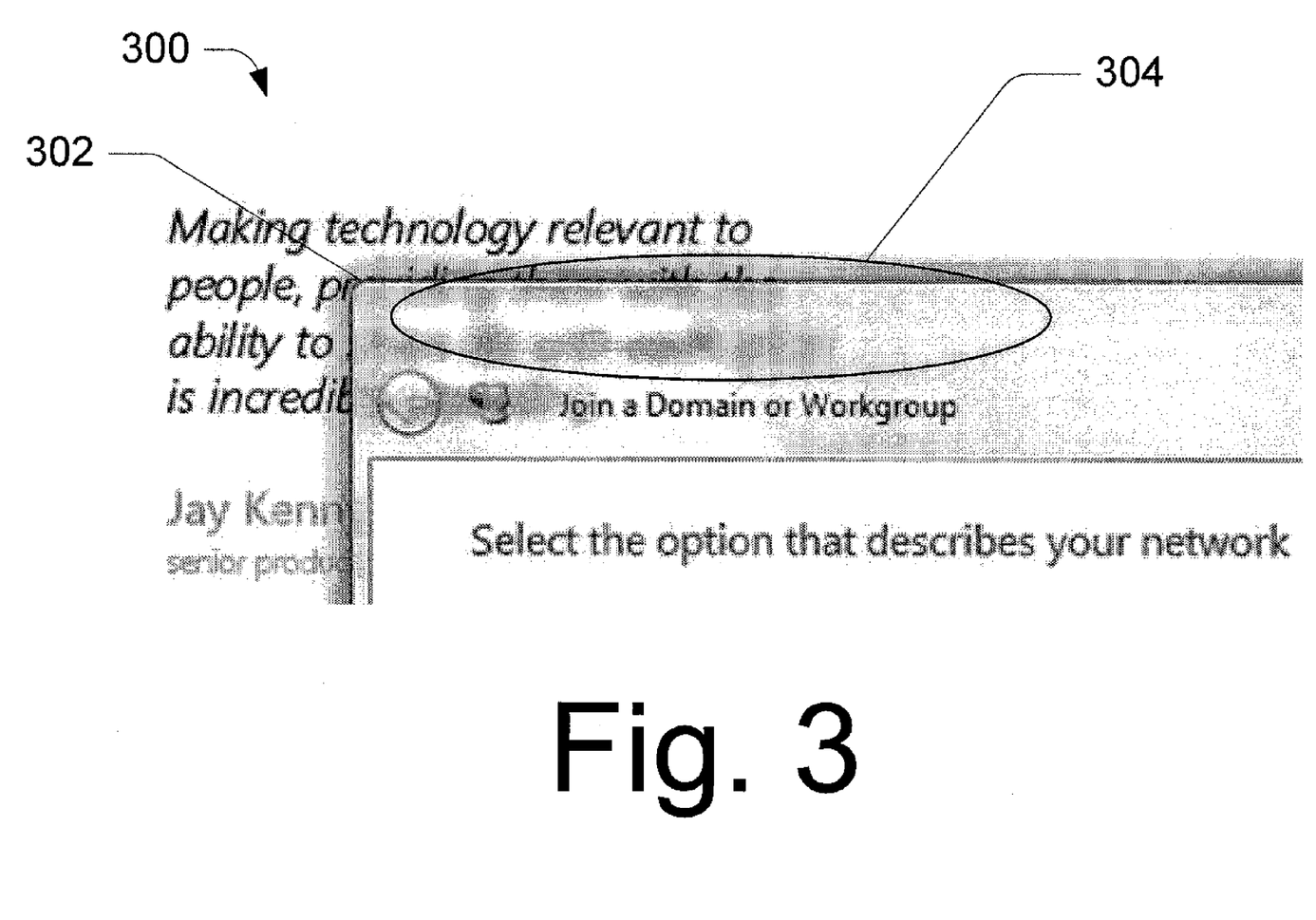
FIG. 3 illustrates an exemplary user interface that incorporates blurring/colorization in accordance with one embodiment.

There, an exemplary user interface 300 is shown. Notice here that there is a transparent glass frame portion 302 behind which appears a blurred portion 304. This blurred portion is provided by rendering the blur element illustrated in FIG. 2. An example of how rendering of this element can take place is described in U.S. patent application Ser. No. 11/289,514, entitled "Glass Appearance Window Frame Colorization", naming Don Lindsay as inventor.

Figure 4:
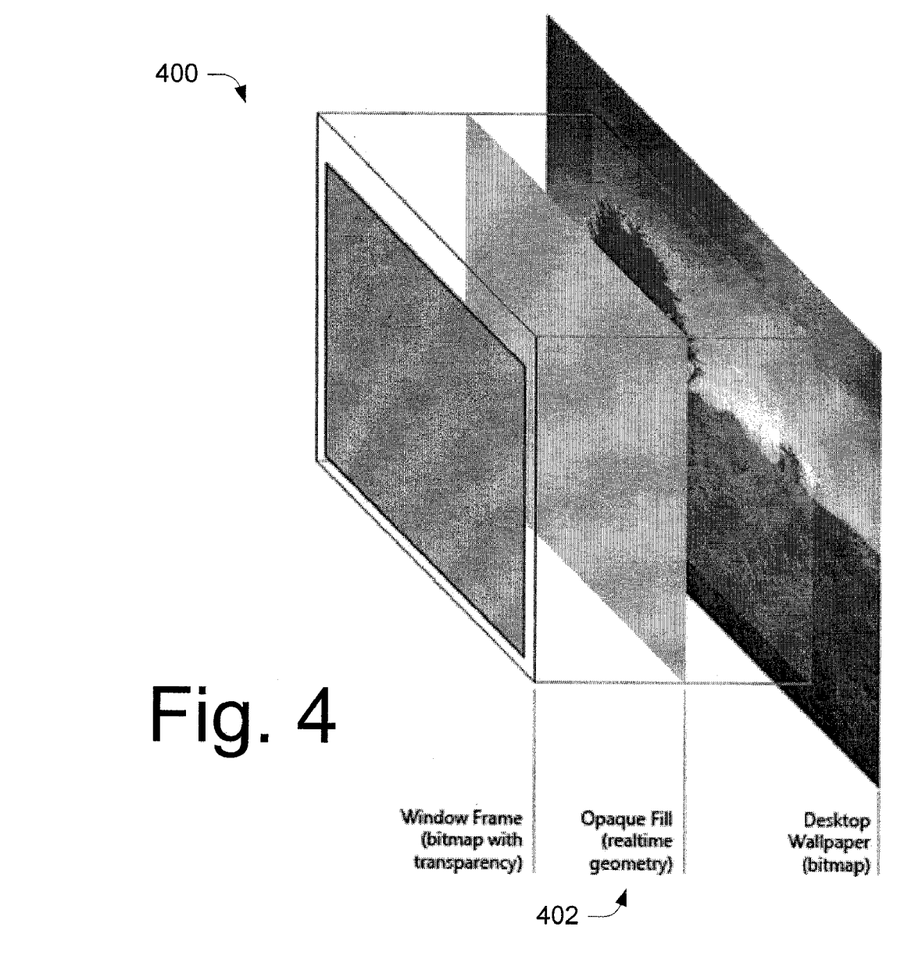
FIG. 4 illustrates various layers that represent how an application window frame is constructed in an intermediate graphics tier in accordance with one embodiment.

Intermediate Tier—Transparent Glass Window Frame with Real Time Blurring Rendered as Opaque FIG. 4 illustrates, generally at 400, the various layers that represent how an application window frame is constructed in an intermediate graphics tier in accordance with one embodiment. In this approach, both bitmaps and realtime window geometry computations are utilized to render application window frames that comprise part of a user interface.

In this example, many of the same elements that make up the user interface of FIG. 2 are used. Again, these elements can be traditionally rendered using bitmaps. Notice here, however, that the blur element of FIG. 2 has been replaced with an opaque base color element 402 which is interposed between overlying bitmaps and the desktop wall paper. This opaque base color element is generated by computing, in real time, the application window geometry dimensions relative to which the opaque base color is to be rendered, and then rendering, for a particular computed window geometry, the opaque base color element. The effect of this rendering is to provide an opaque portion of the user interface which replaces the blurred element referenced above. As an example, consider FIG. 5.

Figure 5:
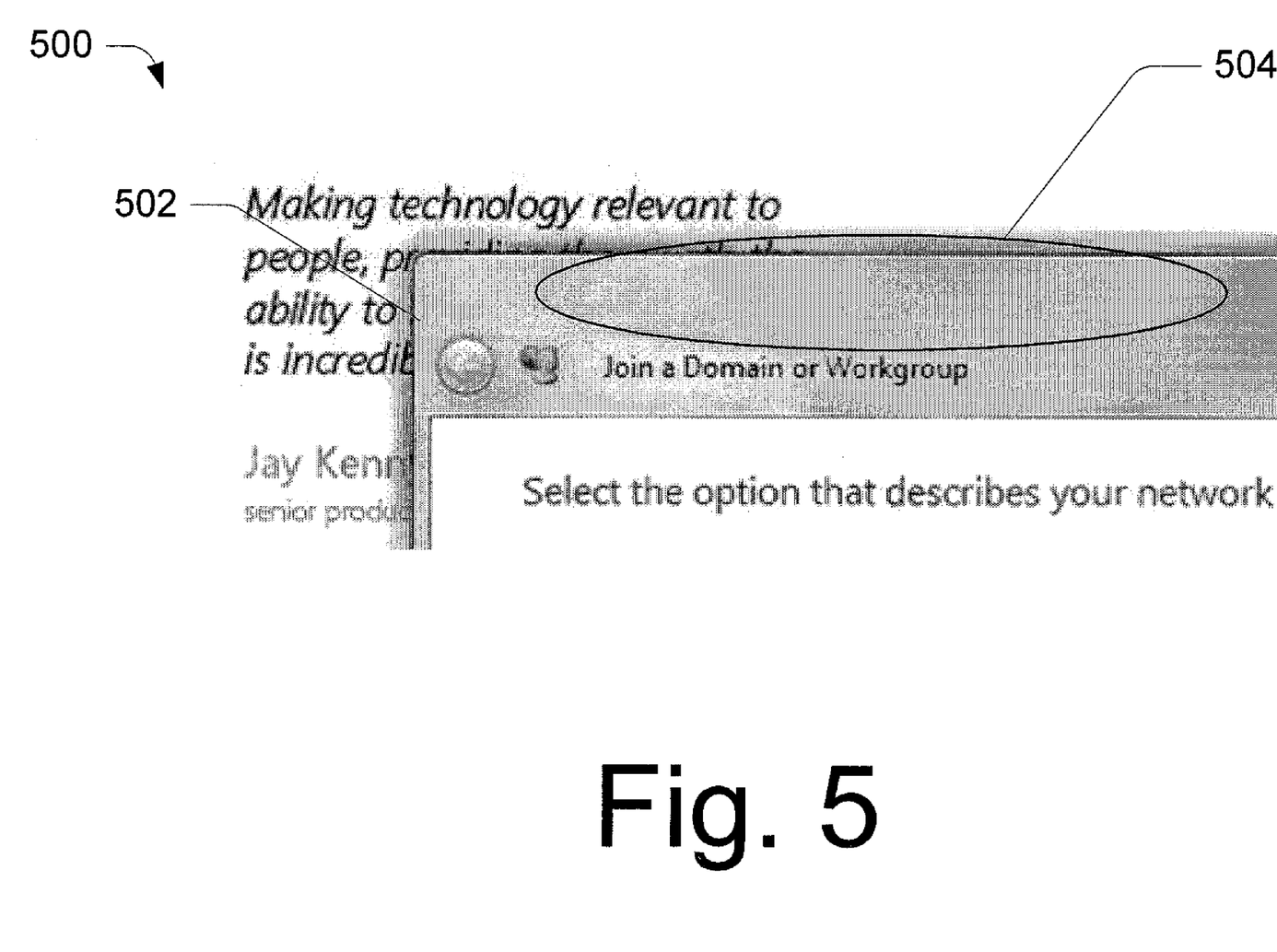
FIG. 5 illustrates an exemplary user interface that is rendered at the intermediate graphics tier in accordance with one embodiment.

There, an exemplary user interface 500 is shown. Notice here that there is a transparent glass frame portion 502 behind which appears an opaque portion which effectively removes or replaces the blurred element. This opaque portion is provided by rendering the opaque element illustrated in FIG. 4.

Notice here that the very same theme (i.e. collection of bitmaps and their associated rules) from the topmost tier has been utilized. Here, however, the theme portion pertaining to the rendering of the transparent/blurred portions of the user interface (FIG. 2) have been repurposed by substituting for it an opaque portion. In this manner, the processing overhead added by the high end rendering that is utilized by the topmost tier can be mitigated in favor of lower overhead processing to render the opaque geometry at the intermediate tier. Further economies are gained by leveraging most if not all of the same bitmaps of the topmost tier.

In effect, from a user's perspective, the only thing that changes as between these tiers is the presence of the blur element (FIG. 2). This can provide a generally seamless and visually continuous spectrum as between the tiers. For example, and as described in more detail below, assume a user is working on their laptop and has a direct power connection. Assume also that the user's laptop is a high end device that has a video card that is capable of rendering the blur/colorization element described above. Assume now that the user unplugs their laptop but continues to work on it. In this case, the topmost graphics tier can be automatically replaced by the intermediate graphics tier to provide a visually continuous and seamless transition between user interfaces. In addition, transitioning to the intermediate graphics tier also results in power savings insofar as the intermediate graphics tier will typically utilize less power than the topmost tier.

Figure 6:
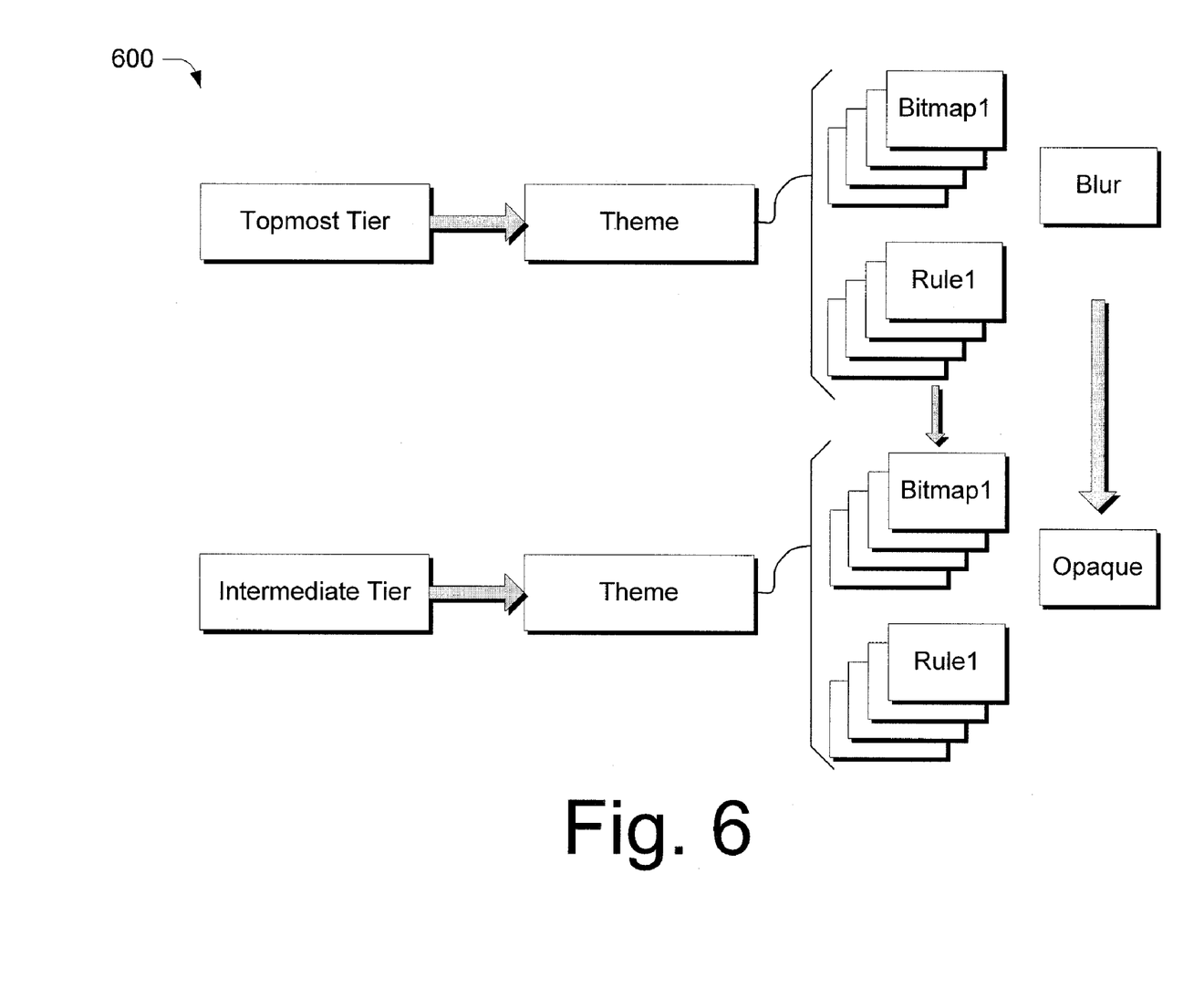
FIG. 6 illustrates a graphics tiering strategy that utilizes themes in accordance with one embodiment.

FIG. 6 illustrates, generally at 600, a graphics tiering strategy that utilizes themes in accordance with one embodiment. In this example, the topmost tier is associated with a theme that includes one or more bitmap images, rules associated with those bitmap images, and a blur element that can be utilized to provide the transparent/blurring functionality described above. Notice also that the intermediate tier (or, for our purposes, another different tier) utilizes the same theme except that the blur element is repurposed with an opaque element. Thus, the very same bitmaps and rules from the topmost tier can be utilized, with the blur element being replaced by the opaque element as described above.

Figure 7:
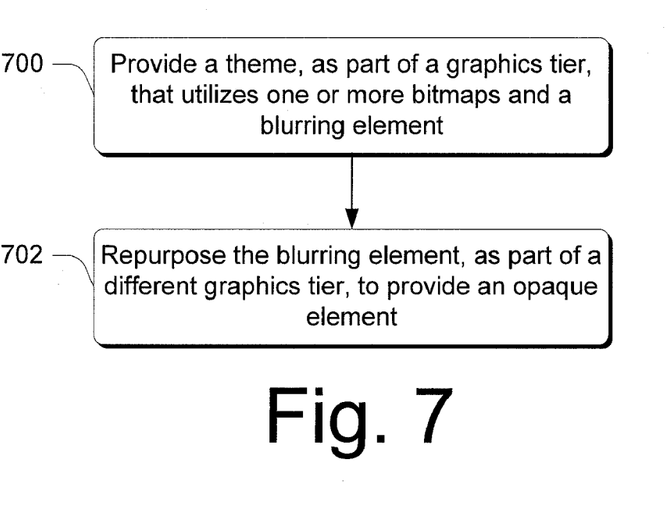
FIG. 7 is a flow diagram that describes steps in a method in accordance with one embodiment.

FIG. 7 is a flow diagram that describes steps in a method in accordance with one embodiment. The method can be implemented in connection with any suitable hardware, software, firmware or combination thereof. In at least some embodiments, the method can be implemented, at least in part, in software (computer-readable instructions) that resides on some type of computer-readable media, such as RAM, ROM, flash, hard disk and the like in at least some embodiments, the method can be implemented in connection with a system, such as the system shown and described below in FIG. 10.

Step 700 provides a theme, as part of a graphics tier that utilizes one or more bitmaps and a blurring element. Any suitable bitmaps can be utilized. In addition, in this example, the blurring element is provided by software that executes to provide the blurring element. Step 702 repurposes the blurring element, as part of a different graphics tier, to provide an opaque element. This step can be performed in any suitable way. For example, the component that is responsible for rendering the blurring element can simply be provided with different parameters for rendering the opaque element. Alternately or additionally, the component might be repurposed by utilizing a different component for the rendering. In at least some embodiments, the principles upon which such a component operates can include the ability to compute, in real time, window geometry and dimensions relative to which rendering is to take place and, responsively, render an opaque object relative to the window geometry and dimensions.

Having now described the notion of graphics tier strategies as well as the notion of repurposing portions of a tier's theme, consider the following scenarios that can drive selection of a particular graphics tier.

Use Scenario

In at least some embodiments, a particular graphics tier can be selected based upon a use scenario. That is, depending on a particular operating environment in which a computing device finds itself, a particular graphics tier can be selected. In addition, selection of a graphics tier can include automatically switching between different graphics tiers. As an example, consider the following. Assume that a user on a high end computing device with robust graphics processing capabilities is utilizing the topmost graphics tier, such as the one described above. Assume also that this user has a direct power connection that facilitates use of the topmost graphics tier. Assume now that the user switches the device to battery mode. In a power savings move, the computing device ascertains that it no longer has a direct power connection and, responsively, switches from the topmost graphics tier to another graphics tier. In the example above, this can mean switching from a tier that permits transparency/blurring functionality to a tier that replaces this with opaque functionality.

As an example of another use scenario, consider the following. Assume that an application may request that an operating system temporarily disable the window frame transparency. This can happen, for example, in situations where full-screen games explicitly turn off the transparency functionality to improve overall game performance.

Figure 8:
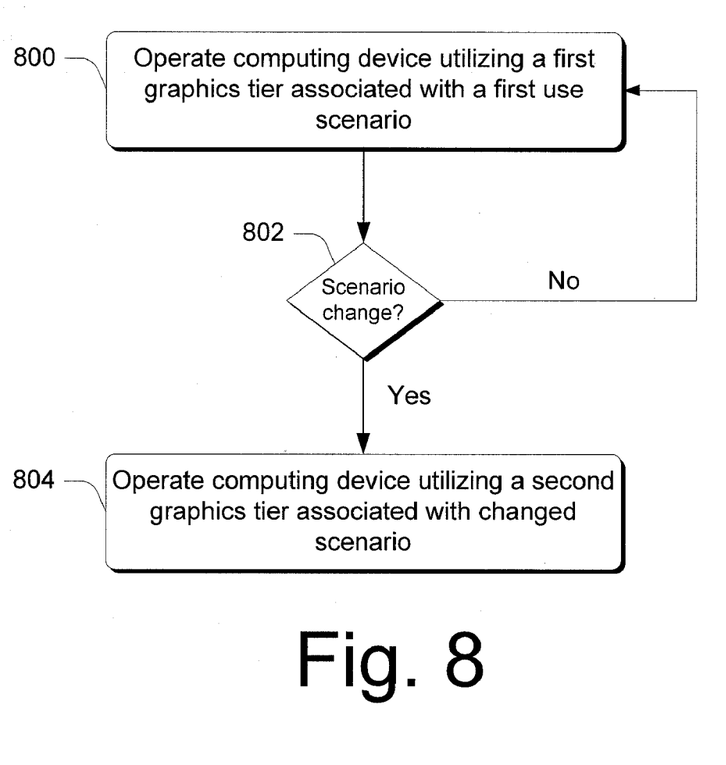
FIG. 8 is a flow diagram that describes steps in a method in accordance with one embodiment.

FIG. 8 is a flow diagram that describes steps in a method in accordance with one embodiment. The method can be implemented in connection with any suitable hardware, software, firmware or combination thereof. In at least some embodiments, the method can be implemented, at least in part, in software (computer-readable instructions) that resides on some type of computer-readable media, such as RAM, ROM, flash, hard disk and the like. In at least some embodiments, the method can be implemented in connection with a system, such as the system shown and described below in FIG. 10.

Step 800 operates a computing device utilizing a first graphics tier associated with a first use scenario. Examples of graphics tiers are described above. In addition, examples of use scenarios are described above. Step 802 ascertains whether the use scenario has changed. If the scenario has not changed, then the method loops back to step 800. If, on the other hand, the use scenario has changed, step 804 operates the computing device utilizing a second graphics tier associated with the changed scenario.

In the example above, the first graphics tier might be associated with a direct power connection or a battery connection. Likewise, the second graphics tier might be associated, respectively, with a battery connection or a direct power connection. Thus, when a device is switched between and amongst direct power connections and battery connections, the corresponding graphics tier can be switched as well.

Computing Device Scenario

In at least some embodiments, a particular graphics tier can be selected based upon the capabilities of the computing device being used. For example, for certain high end devices that include robust processing capabilities that support the higher end graphics tiers, those tiers might be selected. Alternately, for those devices that do not include robust processing capabilities that support the higher end graphics tiers, they will be constrained to a lower end graphics tiers.

Figure 9:
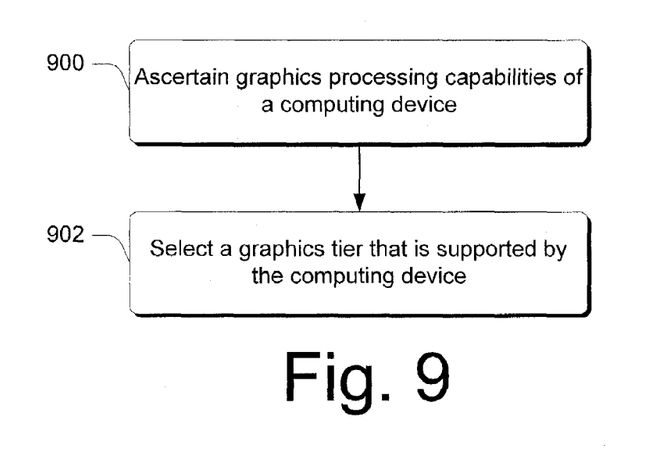
FIG. 9 is a flow diagram that describes steps in a method in accordance with one embodiment.

FIG. 9 is a flow diagram that describes steps in a method in accordance with one embodiment. The method can be implemented in connection with any suitable hardware, software, firmware or combination thereof. In at least some embodiments, the method can be implemented, at least in part, in software (computer-readable instructions) that resides on some type of computer-readable media, such as RAM, ROM, flash, hard disk and the like. In at least some embodiments, the method can be implemented in connection with a system, such as the system shown and described below in FIG. 10.

Step 900 ascertains graphics processing capabilities of a computing device. This step can be performed in any suitable way. For example, in at least some embodiments, this step can be performed by calling an appropriate API, such as a GetCapabilities API to ascertain a device's particular graphics processing capabilities. Once the device's graphics processing capabilities have been ascertained, step 902 selects a graphics tier that is supported by the computing device. In at least some embodiments, this step can be performed by selecting from among graphics tiers such as the ones described above.

Software Price Point Scenario

In at least some embodiments, a particular graphics tier can be selected based upon the price point of a particular software package that embodies or otherwise uses graphics functionality. Specifically, in some situations, the same software package—for example, an operating system—will be offered at different price points that are targeted for different markets. For example, some software packages might be targeted for home use and offered at a first price. The home use software might not utilize high end graphics processing. In this instance, the functionality associated with the high end graphics can be turned off or otherwise deactivated. In this case, the software package might be configured with an intermediate graphics tier that does not include all the functionality of the topmost graphics tier. Alternately, the software package might be targeted for a business or high end user and offered at a second higher price. In this case, the software package might be configured to turn on the topmost graphics tier.

Thus, the decision to choose a particular graphics tier can be based on the price point of the software package that embodies the graphics functionality.

Exemplary System

Figure 10:
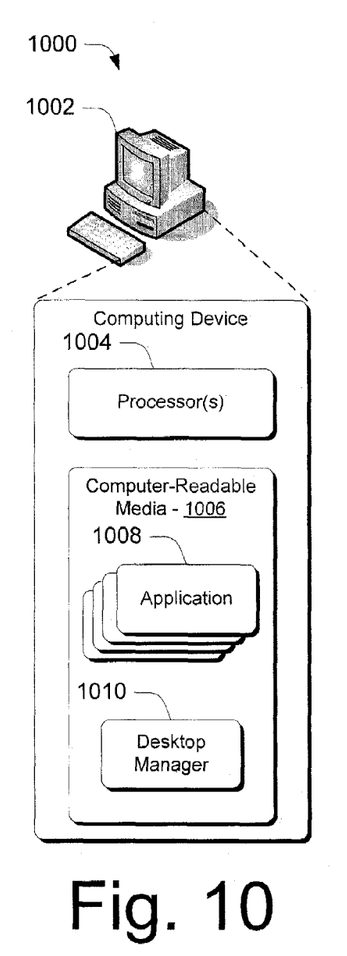
FIG. 10 illustrates a system in accordance with one embodiment

FIG. 10 illustrates a system in accordance with one embodiment, generally at 1000. System 1000 includes a computing device 1002 having one or more processors 1004, one or more computer-readable media 1006 and one or more applications 1008 that reside on the computer-readable media and which are executable by the processor(s). In addition, computing device 1002 includes a desktop manager 1010 which, in this example, is implemented in software.

Although computing device 1002 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In this example, desktop manager 1010 is responsible for window rendering activities on the computing device. Hence, this component is responsible for working with applications to render application windows on the device's display, as well as manage and oversee windowing activities. In the illustrated and described embodiments, the desktop manager is responsible for implementing the graphic tiering strategies described above. This can include, by way of example and not limitation, providing the selectable graphics tiers and then making tier selections based upon various inputs that are received.

CONCLUSION

Various embodiments employ a graphics tiering approach that utilizes multiple different tiers, each of which defines how a user interface is presented to a user. In accordance with at least some embodiments, a higher end tier is provided and utilizes a combination of both bitmaps and realtime window geometry computations to provide a user interface that can include both transparent and blurred user interface elements. In addition, at least some additional tiers repurpose the higher end tier by incorporating an opaque element behind the transparent element to satisfy the limitations associated with the additional tiers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented on a computing device by a processor configured to execute instructions that, when executed by the processor, direct the computing device to perform acts comprising:

ascertaining a graphics tier for use in generating a user interface on the computing device based on a use scenario;

providing a first graphics tier that is configured to be used to render a first user interface, the first graphics tier comprising a desktop wall paper, bitmaps, and a transparent window frame, wherein realtime window geometry computations are utilized to provide a blur element interposed between the bitmaps and the desktop wall paper, the blur element configured to blur the background behind the transparent window frame;

providing a second graphics tier that is configured to be used to render a second user interface, the second graphics tier using the desktop wall paper, the bitmaps, the transparent window frame, and the realtime window geometry computations of the first graphics tier, wherein the realtime window geometry computations are utilized to provide an opaque element interposed between the bitmaps and the desktop wall paper instead of the blur element; and switching automatically between the first graphics tier and the second graphics tier when the use scenario changes.

2. The method of claim 1, wherein the use scenario comprises least one of a video hardware capability, a power source, a price point of an operating system generating the graphics tier, or an application running on the computing device.

3. The method of claim 2, wherein the switching automatically between the first graphics tier and the second graphics tier is performed responsive to a change in the application running on the computing device from an application utilizing a window size that is smaller than a full screen to a full-screen application.

4. The method of claim 2, wherein the switching automatically between the first graphics tier and the second graphics tier is performed responsive to a change in the power source from a direct power connection to a battery.

5. The method of claim 1, wherein the blur element is provided in realtime by a pixel shader.

6. The method of claim 1, wherein the second graphics tier utilizes less electrical power than the first graphics tier.

7. One or more computer-readable media having computer-readable instructions thereon which, when executed, implement a graphics tiering strategy that utilizes themes, the computer-readable media comprising:

a module for ascertaining a graphics tier for use in generating a user interface on a computing device based on a use scenario a first graphics tier to render a first user interface comprising a first theme that includes a desktop wall paper, bitmap images, rules associated with the bitmap images, a transparent window frame, and a blurring element interposed behind the bitmap images and in front of the desktop wall paper, wherein the blurring element is rendered in realtime in a window relative to the window geometry and dimensions, the blurring element configured to blur the background behind the transparent window frame;

a second graphics tier to render a second user interface that utilizes the first theme that includes the desktop wall paper, the bitmap images, the rules associated with the bitmap images, the transparent window frame except that realtime rendering of the blurring element is replaced by an opaque element interposed behind the bitmap images and in front of the desktop wall paper, the realtime rendering of the blurring element is performed in the window relative to the window geometry and dimensions; and a switching module to switch automatically between the first tier and the second tier when the use scenario changes.

8. The one or more computer-readable media of claim 7, wherein said instructions can cause a computing device to automatically switch between the first tier and the second tier.

9. The one or more computer-readable media of claim 8, wherein automatic switching between tiers can occur relative to one or more use scenarios.

10. The one or more computer-readable media of claim 9, wherein one use scenario is associated with a power connection to a device on which the instructions are executed.

11. The one or more computer-readable media of claim 10, wherein when the power connection comprises a direct power connection, the first tier is utilized and when the power connection comprises a battery, the second tier is utilized.

12. The one or more computer-readable media of claim 7, wherein said instructions can cause one of the tiers to be selected based upon processing capabilities of a computing device on which the instructions are executed.

13. The one or more computer-readable media of claim 12, wherein when the processing capabilities of the computing device comprise a pixel shader, the first tier is utilized and when the processing capabilities do not comprise a pixel shader, the second tier is utilized.

14. The one or more computer-readable media of claim 7, wherein said first and second tiers are configured to be selected based upon a price point of a software package embodying said instructions.

15. A computing device comprising:
one or more processors;
one or more computer-readable media; computer-readable instructions on the one or more computer-readable media which, when executed, implement a method comprising:

operating the computing device utilizing a first graphics tier that is configured to be used to render a first user interface and is associated with a first use scenario, the first graphics tier comprising a desktop wall paper, bitmaps, and a transparent window frame, wherein realtime window geometry computations are utilized to provide a blur element interposed between the bitmaps and the desktop wall paper, the blur element configured to blur the background behind the transparent window frame;

ascertaining a change in a use scenario utilized on the computing device; and responsive to the change in the first use scenario, automatically switching the computing device to a second graphics tier that is configured to be used to render a second user interface and is associated the changed scenario, the second graphics tier using the desktop wall paper, the bitmaps, the transparent window frame, and the realtime window geometry computations of the first graphics tier, wherein the realtime window geometry computations are utilized to provide an opaque element interposed between the bitmaps and the desktop wall paper instead of the blur element.

16. The computing device of claim 15, wherein the first use scenario is associated with a direct power connection.

17. The computing device of claim 15, wherein the changed scenario is associated with a battery connection.

18. The computing device of claim 15, wherein the method further comprises responsive to a change in the changed scenario, switching to a graphics tier that is different from the second graphics tier.

19. The computing device of claim 18, wherein said different graphics tier comprises the first graphics tier.

* * * * *